United States Patent Office 3,161,570
Patented Dec. 15, 1964

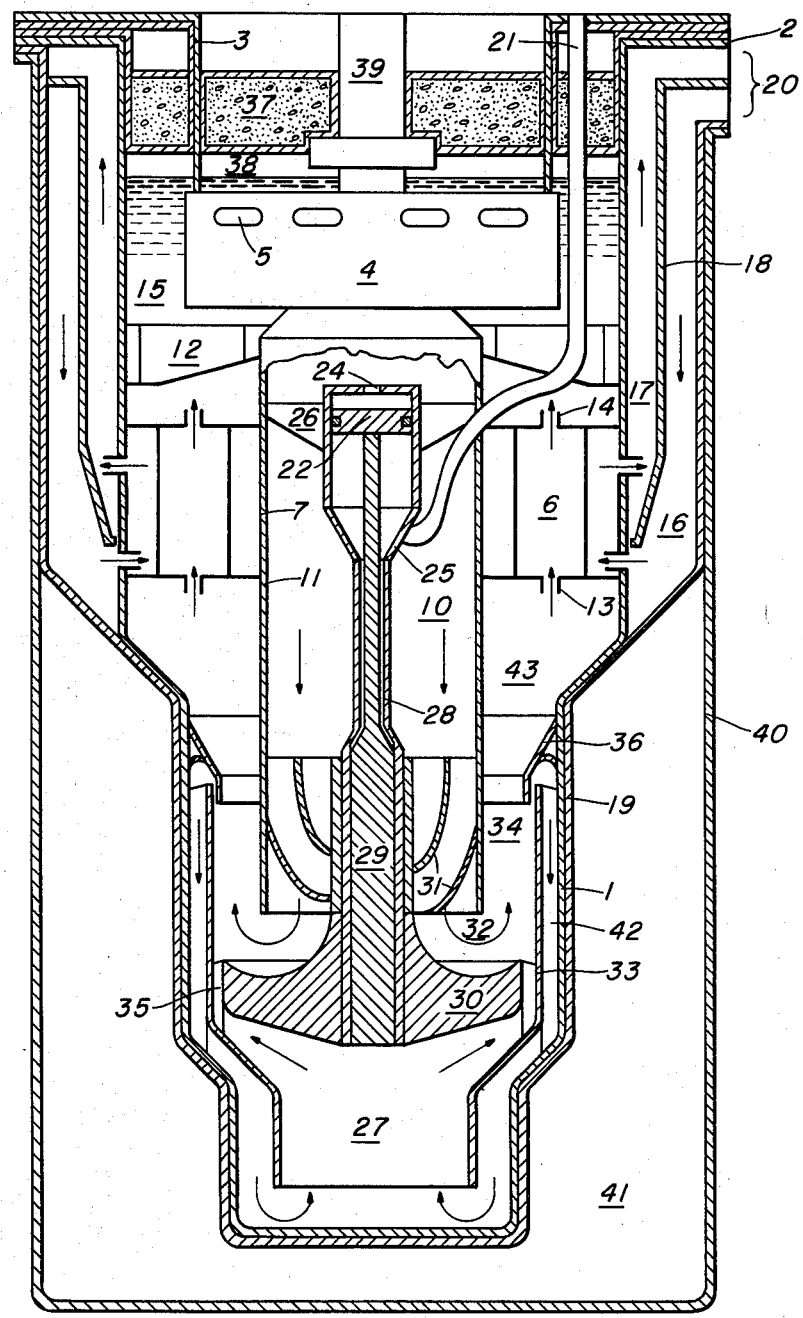

3,161,570
HOMOGENEOUS-LIQUID METAL-FAST REACTOR
Roland Philip Hammond, Harold M. Busey, and John R. Humphreys, Jr., all of Los Alamos, N. Mex., assignors to the United States of America as represented by the United States Atomic Energy Commission
Filed Dec. 13, 1961, Ser. No. 159,195
5 Claims. (Cl. 176—40)

The present invention relates to nuclear reactors and more particularly to homogeneous nuclear reactors utilizing liquid fuel.

The nuclear reactor of the present invention is an improved reactor of the homogeneous type utilizing a liquid plutonium alloy fuel. The invention relates to a direct contact core which takes advantage of the immiscibility of sodium with molten plutonium alloy for partial fission product extraction and heat removal from the core by direct mixing of liquid fuel with the coolant.

The utilization of plutonium as a power reactor fuel presents major differences from the use of uranium. The toxicity of plutonium prevents the use of direct handling and fabricating procedures, and the low melting point, complex metallurgy of its alloys, and strong fluxing tendencies of the metal make the thermal performance of metallic fuel elements very poor. For a solid fuel, the most feasible form would be a ceramic, but the remote handling procedures required would make such material expensive to fabricate.

Since the direct contact core contains essentially only liquid fuel, and is always full, a temperature rise produces both lowering of fuel density and removal of fuel from the core. The net effect is a prompt temperature coefficient of reactivity of about $-5 \times 10^{-5}$ per degree C. This large coefficient produces a high degree of stability and self-regulation, as has been well demonstrated with other liquid fuel reactors, such as Los Alamos' water boiler, LAPRE II, LAMPRE I, and the Oak Ridge HRE and HRT. When operating at power, such reactors respond to the insertion or withdrawal of reactivity primarily by a change in operating temperature, the power remaining the same until the demand of the heat extraction system is changed.

Operating control of such a reactor is thus conveniently achieved by heat demand, and the reactivity is adjusted only to obtain the desired operating temperature. With this mode of control there is no excess reactivity held in control mechanisms, eliminating a major source of danger. In the direct contact core, temperature adjustment could best be made by means of the plutonium concentration of the fuel. With fuel at the proper concentration, the core would be hot and critical whenever filled, so that accidental freeze-up of the fuel would be impossible. To shut down the core, the fuel would be pumped to a storage reservoir by a small sodium jet pump. The core arrangement shown in the figure includes a fuel displacement plunger, which would be used only if an emergency occurred in which freeze-up of the fuel would be desired or unimportant.

The inherent safety characteristics of this reactor concept may turn out to be even more important than the cost of power it produces. The core of the direct contact reactor is essentially structureless. It consists of a closed container completely full of fuel. Inlet and outlet pipes connect the core with a jet pump and separator, which are isolated neutronically from the core to some extent. Closely fitting around the core is a secondary container and blanket region. Should a rupture or leakage of the core occur, it would be nearly impossible for the liquid fuel to assume a configuration of higher criticality (greater buckling) than it had in the core. The fuel system contains no voids which could fill with fuel, no fuel elements which could melt down or move together, and no coolant to be displaced. The neutron baffle which separates the core and the jet pump and separator would have to be rigidly prevented from movement in either direction.

The temperature margin which separates the normal operating condition of a solid fuel element and the meltdown temperature is relatively narrow, often only a few hundred degrees. For the direct contact reactor the hazard of meltdown is non-existent since the fuel is already molten, and the temperature margin of more than 2200 degrees centigrade between the highest operating temperature and the melting point of tantalum is greater than that of any other reactor.

The large prompt negative temperature coefficient of reactivity of a liquid fuel reactor is well known. It provides a built-in shutdown mechanism which has the capability of absorbing relatively large and rapid insertions of reactivity with no after effect except a rise in temperature. The calculated temperature coefficient of the direct contact core is $-5 \times 10^{-5}$ per ° C., which is the same as that measured for LAMPRE I. For the latter reactor, R. M. Kiehn has calculated that a rapid insertion at the rate of $5000 per second would not result in mechanical damage to the core, provided the total temperature rise were not too high.

The direct contact of sodium with the fuel provides the continuous removal of fission products, so that a smaller inventory is stored in the core system in the vent of release to the surroundings.

Therefore, it is an object of the present invention to provide a novel method and means for removing directly both heat and fission products from a liquid reactor core.

A further object of the present invention is to provide a homogeneous nuclear reactor core capsule containing a core vessel, jet pump and phase separator, sodium coolant heat exchanger, sodium coolant pump, and a sodium coolant surge chamber, each of which elements may be arranged one above the other within the cylindrical envelope of the core capsule.

A further object of the present invention is to provide a homogeneous nuclear reactor which is highly compact, uses the minimum of connecting piping, provides its own structural support, alleviates shielding problems, maintains inventory, and provides relatively few connections for replacing the simple core container and jet pump.

Other objects and advantages of the present invention will become more apparent from the following description including the drawing hereby made a part of the specification.

The figure is a vertical partial cross-sectional view through the core capsule showing the internal components thereof.

*Apparatus*

The preferred embodiment of the present invention as shown in the figure comprises a test tube shaped reactor vessel 1 preferably fabricated from tantalum. Vessel 1 is closed at the bottom and terminates in flange 2 at the top. Suspended from said flange 2 is a hollow cylindrical structural support 3 which supports the primary sodium pump 4, shown schematically in the figure, which pump is connected through housing 39 to its necessary adjuncts external to vessel 1. Pump 4 is provided with sodium inlet openings 5 in its upper end. Supported by pump 4 and extending downwardly therefrom is the sodium outlet conduit 11 which defines the sodium outlet duct 10. Conduit 11 is supported against lateral movement by a plurality of flanges 12.

Positioned below said pump 4 and supported by the wall of vessel 1 is a heat exchanger 6, shown symbolically, which is provided with a central concentric bore 7 within which conduit 11 fits. Hot sodium enters the heat exchanger 6 at opening 13 wherein it gives up its heat to a secondary sodium circuit which is used to generate steam. The cooled sodium leaves the heat exchanger 6 at opening 14 where it flows into sodium surge chamber 15. The secondary sodium circuit includes annular inlet channel 16 and annular outlet channel 17. These channels are defined by vessel 1, cylindrical flow directing baffle 18, and outer container 19. The secondary sodium system pump and steam generating means are connected to channels 16 and 17 at connection 20.

Extending down through the top of the horizontal flange of support 3 is a control conduit 21. Conduit 21 is connected to the displacement rod actuator 25 which is supported within the sodium outlet conduit to which it is attached by means of a plurality of supports 26. Extending downward from the actuator 25 to a point adjacent the top of the core 27 is the displacement rod housing 28 within which extends the displacement rod 29 preferably fabricated from tantalum or tungsten. The housing 28 terminates within the shield 30 which defines the top of the core 27. Shield 30 is preferably fabricated from tantalum or tungsten. Rod 29 is normally maintained in the retracted position within its housing by fluid pressure in conduit 21 acting on piston 22 (it may be an expansible bellows instead of piston). If fluid pressure is interrupted, the primary sodium in region 10 enters through vent 24, and drives the rod 29 downward, aided by gravity. Displacement of fuel by rod 29 will terminate the chain reaction.

Provided within said sodium outlet conduit 11 at its lower end are a series of spiral baffles 31 which extend between the wall of conduit 11 and an upper extension of shield 30. These baffles serve to provide the sodium flowing through duct 10 from pump 4 with a rapidly rotating movement. Conduit 11 extends down adjacent to but spaced from shield 30 to provide a sodium flow reversal region 32. The top of shield 30 is concave to provide for a smooth rather than a turbulent sodium flow. A flow directing baffle 33 extends both upwardly and downwardly from shield 30. Baffle 33 is spaced from the wall of vessel 1 to provide a fuel return path 42 from the centrifugal separation region 34 to the core 27. Shield 30 is provided with circumferentially spaced peripheral fluid communication ducts 35. The sodium, in flowing past these openings continuously withdraws a portion of the fuel from the core 27, in a jet pumping action. An annular heavies discharge slot is provided in the separation region 34 at the upper end of baffle 33 by means of the annular ring 36 which is attached to the wall of vessel 1 and extends inwardly and down past the upper end of baffle 33 adjacent thereto but spaced therefrom.

The upper end of vessel 1 is enclosed and sealed by means of shield 37, which may consist of a concrete shield within a steel housing. This provides a sealed gas volume 38 above the sodium in the surge volume 15. Inlet and outlet gas piping (not shown) may be provided to establish communication with this gas volume 38.

Provided within container 40 outside of container 19 and below the secondary sodium circuit is a blanket region 41. As a breeder blanket is well known in the art and forms no part of the present invention, its details are not shown.

Liquid Fuel System

The fuel proposed for the direct contact core is an alloy of plutonium, cerium, and cobalt. The alloy exhibits a lower temperature eutectic valley with a melting point near 420° C. and a more or less constant cobalt content of about 25 atomic percent (a/o). This means that plutonium and cerium may be used in varied ratios over a wide range, with little change in melting point. This characteristic permits the plutonium enrichment of the fuel to be chosen to suit the reactor design, a degree of freedom which is most important in obtaining high performance core designs.

In the preferred embodiment of the present invention the fuel consists of 67.5 a/o cerium, 25 a/o cobalt, and 7.5 a/o plutonium.

Other fuel systems are also possible, but have not yet been studied as fully. The system plutonium, cerium, copper, though limited to plutonium concentrations over a narrower range, includes those of interest for large scale application. There are indications that this system may prove less corresive than the cobalt system, though tests of this point are just beginning.

Container and Structural Materials

The requirements for a direct contact core are significantly different from those for a core embodying an internal heat exchanger.

The core consists principally of a container shell; there is very little internal structure, and this need not be leaktight, since it functions only as a flow guide.

There is no heat transfer across container walls, so they can be made as thick as desired within neutron loss limitations. Pressure stresses can be kept fairly low, and thermal stresses will exist only during temperature transients.

Fairly high corrosion rates can be tolerated because of the thick walls and low surface to volume ratio. There are no small fuel or coolant passages to become clogged.

High temperature gradients and high velocities in the fuel mean that mass transfer and erosion must be successfully resisted.

Small droplets of fuel will remain entrained in the sodium stream after the phase separation step. Such droplets would alloy with stainless steel components, so that the primary sodium system, pump, and heat exchanger must be constructed or clad with refractory metal on the primary coolant side.

Materials effort to date has been primarily concerned with the highly concentrated (15 g./cc.) plutonium fuel used in LAMPRE I. The tests so far with dilute fuel indicate that it is easier to contain than the LAMPRE I fuel. High purity tantalum, yttrium, and niobium all show good promise in these static tests and all are resistant to sodium. For non-structural portions of the core, as in liners, nozzles, and flow baffles, a ceramic body would be feasible. In preliminary tests, a few ceramic materials such as alumina, beryllia, and yttria have shown good resistance to the dilute fuel.

Liquid Fuel and Coolant Circulation

The liquid fuel utilized in the reactor of the present invention is circulated by means of the sodium jet pump. Sufficient sodium is provided so as to maintain the sodium level shown in the figure in the surge chamber 15. From the surge chamber the sodium flows through the pump inlet openings 5 through the sodium pump 4, down inlet duct 10, into the flow reversal region 32. Just prior to reaching region 32, the sodium is given a rotational motion by means of spiral baffle 31. Due to the jet pumping action of the sodium passing over the circumferentially spaced peripheral openings 35 in shield 30, liquid fuel is drawn up through said openings 35 and carried into flow reversal region 32 wherein the fuel is intimately mixed with the sodium. Heat and fission products are transferred from the fuel to the sodium at this point. As this mixture travels up into the separating region 34, the fuel being more dense moves outwardly due to the centrifugal force resulting from the rotational movement of the mixture. By the time the mixture has reached the heavies discharge slot provided by ring 36, the mixture has stratified into an outer layer of fuel and an inner layer of sodium.

This intimate intermixing is the means which provides heat removal from the core. As in any circulating fuel reactor, heat removal is determined by the flow rate and temperature rise. The volumetric heat capacity of the fuel is estimated at about 0.47 cal./cc. ° C., which means that at 250° C. temperature rise, about 32 gallons per minute must be circulated per megawatt of power. The most appropriate sodium flow for a given fuel flow is subject to several factors, a volume ratio near 3:1 being selected for the present invention. A sodium flow of 100 g.p.m. per megawatt gives a temperature rise of about 150° C.

The temperature rise of the fuel is superimposed upon that of the sodium, since the heat transfer is concurrent. The lowest temperature in the sodium system must be above the melting point of the fuel, so that any entrained droplets will drain back to the core, rather than freeze to the heat exchanger or other surface. The sodium then flows up annular duct 43 and into the heat exchanger 6 from whence it flows into the surge chamber 15.

*Fission Product Extraction*

The continuous contact of the fuel and sodium streams in the region 32 will allow extraction of fission products of the alkali, alkaline earth, tellurium, and halogen groups into the sodium, along with the gaseous elements. The sodium soluble products could be left in the sodium, since they are neglible in quantity, amounting to about 1 part per thousand after a full year. The buildup of radioactive species, however, can be avoided by reprocessing the sodium, and equipment for this may be included in the plant design.

The other fission products are expected to remain in the fuel phase. Estimates of the solubility and rate of build-up of such products in the fuel show that only minor perturbations of the composition and melting point would be expected even if all the original plutonium were fissioned, with new plutonium added to maintain reactivity. This 100% burn-up level would be reached in six or seven years at the specific power expected in such cores. At some point the solubility limit of zirconium and molybdenum would be reached, and these elements would deposit as a solid phase. It is not yet known just where this would be, but the small amount of material involved is not expected to cause any problems.

A large, dilute, direct contact core is not expected to require any fission product removal for long periods of time. The only core processing necessary would be the addition of plutonium to replace that consumed.

A convenient mechanism does exist, however, for additional fuel processing should it become necessary. A small amount (0.1%) of sodium chloride added to the sodium phase will produce an appreciable solubility of many additional fission products in the sodium phase, which could then be processed in well known ways on a continuous basis.

It is noted that any of the following coolants could be used in place of the sodium: Li, K, Rb, Ce, Bi, $SnF_2$, $NaF \cdot ZrF_4$, or any other immiscible and compatible coolant.

*Operation*

Startup would be initiated by warming the primary and secondary sodium systems, charging with sodium, and raising the temperature of all systems to about 450° C. with electric heat. For example, an electric heater may be located adjacent the outside of container 40. The reactor core would at this time contain no fuel, being filled with primary sodium. Fuel, which is stored in a fuel storage cell (not shown), is then added to the vessel 1 by means of a small sodium jet pump, whereby the heavy fuel will displace the sodium in the core. The full capacity of the pump is small enough to give a safe approach to critical, so several hours are required for the transfer. When about two-thirds of the fuel for the first core is transferred, the core proper is nearly full and criticality is reached. An interlock prevents fuel transfer to the core unless the primary sodium pump for that core is off, so that no heat demand will be placed on a core which is not completely full. After criticality is reached, further fuel addition serves to increase the temperature of the core so that when all the fuel is in, the core is at the hot shutdown temperature of about 525° C. Some heat is transferred by natural convection to the sodium and to the inner blanket as soon as the core temperature exceeds the system temperature; by the time fuel addition is completed the core is producing possibly 50 kilowatts. The slow initiation of sodium flow produces first temperature equalization between fuel and sodium and finally forced fuel circulation.

The removal of load from the core is accomplished by reducing the heat demand at the steam generator or turbine. The core in this condition is operating at heat-leak power with full fuel circulation, and can accept heat demand suddenly. A more complete shutdown consists of interrupting the sodium flow, which stops the fuel circulation except for natural convection. The core remains critical and will not freeze, so it may be left indefinitely.

It is, therefore, apparent that the present invention provides a novel arrangement and association of parts which results in a nuclear reactor having numerous advantages over prior art devices. While presently preferred embodiments of the invention have been described, it is clear that many other modifications may be made without departing from the scope of the invention. Therefore, the present invention is not limited by the foregoing description, but solely by the appended claims.

What is claimed is:
1. A homogeneous nuclear reactor comprising in combination:
   (a) a vessel,
   (b) a pump in the upper end of said vessel,
   (c) a heat exchanger located below said pump,
   (d) a core in the bottom of said vessel containing a quantity of liquid fissionable fuel,
   (e) means for attaining nuclear criticality in a zone of criticality in said core,
   (f) means for providing a jet of liquid sodium above said core,
   (g) means for providing fluid communication between said core and said jet whereby a portion of said fuel is removed from said core and carried into said jet and mixed with said jet,
   (h) means for centrifugally separating said portion of fuel from said mixture of fuel and liquid sodium,
   (i) means for returning said separated fuel to said core, and
   (j) means for directing said sodium to said heat exchanger and then to said pump whereby said pump forces said liquid sodium back into said means for providing a jet of liquid sodium.

2. The homogeneous reactor of claim 1 wherein said jet of liquid sodium above said core is provided by a spiral baffle system situated above said core.

3. The homogeneous reactor of claim 1 wherein said fluid communication means is provided by a plurality of peripheral spaced ducts in the core shield which defines the top of said core container, said shield being in a concave shape.

4. The homogeneous reactor of claim 1 wherein said means for separating the mixture of fuel and liquid sodium is provided by a baffle system that returns the fuel to the core and directs the flow of sodium to a heat exchanger located within the reactor vessel.

5. A homogeneous nuclear reactor comprising in combination:
(a) a vessel,
(b) a core containing a quantity of liquid fissionable fuel located in the bottom of said vessel,
(c) means for obtaining nuclear criticality in a zone of criticality in said liquid fissionable fuel,
(d) a jet pump for circulating sodium, said pump being located above the core and contained within the reactor vessel,
(e) a baffle system located below the pump and above a core shield, which shield defines the top of the core container, said shield having a plurality of peripheral spaced ducts which are in fluid communication with the fuel core,
(f) a baffle means for separating said sodium from said circulating fuel, and
(g) a heat exchanger means within said vessel for removing heat from said sodium.

References Cited by the Examiner
UNITED STATES PATENTS

| | | | |
|---|---|---|---|
| 2,837,476 | 6/58 | Busey | 176—47 |
| 2,865,827 | 12/58 | Dwyer | 176—49 |
| 2,910,417 | 10/59 | Teitel | 75—122.5 |
| 3,029,142 | 4/62 | Coffinberry | 176—37 X |
| 3,041,263 | 6/62 | Kiehn et al. | 176—14 |
| 3,050,454 | 8/62 | Barr et al. | 176—39 |

CARL D. QUARFORTH, *Primary Examiner.*